US012769974B2

(12) United States Patent
Marquardt et al.

(10) Patent No.: US 12,769,974 B2
(45) Date of Patent: Oct. 20, 2026

(54) MULTI-TIER IDENTITIES IN AN RFID CHIP

(71) Applicant: T-Mobile Innovations LLC, Overland Park, KS (US)

(72) Inventors: Ronald R. Marquardt, Woodinville, WA (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 118 days.

(21) Appl. No.: 18/391,627

(22) Filed: Dec. 20, 2023

(65) Prior Publication Data

US 2024/0127022 A1 Apr. 18, 2024

Related U.S. Application Data

(63) Continuation of application No. 17/115,596, filed on Dec. 8, 2020, now Pat. No. 11,900,198.

(51) Int. Cl.
*G06K 19/07* (2006.01)
*G06K 19/077* (2006.01)
(Continued)

(52) U.S. Cl.
CPC ..... *G06K 19/0724* (2013.01); *G06K 19/0708* (2013.01); *G06K 19/07762* (2013.01);
(Continued)

(58) Field of Classification Search
CPC ........... G06K 19/0724; G06K 19/0708; G06K 19/07762; H04L 9/0844; H04L 9/0869; H04L 9/3242; H04L 9/50
See application file for complete search history.

(56) References Cited

U.S. PATENT DOCUMENTS 6,882,128 B1 4/2005 Rahmel et al.
7,652,577 B1 1/2010 Madhow et al.
(Continued)

FOREIGN PATENT DOCUMENTS

EP 2679503 A2 1/2014
EP 3875981 A2 9/2021
(Continued)

OTHER PUBLICATIONS

Final Office Action dated Apr. 1, 2024, U.S. Appl. No. 17/161,415, filed Jan. 28, 2021.
(Continued)

*Primary Examiner* — Thomas D Alunkal

(57) ABSTRACT

A method of transmitting a first tier of information by a radio frequency identity (RFID) chip when hailed in a first frequency band and transmitting a second tier of information by the RFID chip when hailed in a second frequency band. The method comprises receiving a first hailing radio signal in a first frequency band by an application executing on a processor of an RFID chip, in response to receiving the first radio signal, transmitting a first tier of information stored in the RFID chip in the first frequency band by the application, receiving a second hailing radio signal in a second frequency band by the application, and, in response to receiving the second radio signal, transmitting a second tier of information stored in the RFID chip in the second frequency band by the application.

18 Claims, 5 Drawing Sheets

(51) Int. Cl.

| | |
|---|---|
| ***H04L 9/08*** | (2006.01) |
| ***H04L 9/32*** | (2006.01) |
| *H04L 9/00* | (2022.01) |

(52) U.S. Cl.

CPC .......... *H04L 9/0844* (2013.01); *H04L 9/0869* (2013.01); *H04L 9/3242* (2013.01); *H04L 9/50* (2022.05)

(56) References Cited

U.S. PATENT DOCUMENTS 7,986,935 B1 * 7/2011 D'Souza .......... H04M 15/8044 455/406
8,204,794 B1 * 6/2012 Peng .................. G06Q 10/08 705/26.1
8,593,256 B2 11/2013 Isabell
8,680,971 B2 3/2014 Ito
8,941,469 B1 1/2015 Diorio et al.
8,960,543 B2 2/2015 Roedig et al.
9,256,881 B2 2/2016 Engels et al.
9,411,992 B1 8/2016 Marek et al.
9,894,471 B1 2/2018 Zalewski et al.
10,676,240 B2 6/2020 Logunov et al.
10,817,590 B1 10/2020 Daly et al.
10,922,939 B1 2/2021 Shakedd et al.
10,938,449 B1 * 3/2021 Loman ............... G06K 19/0702
11,038,694 B1 6/2021 Kleinman
11,213,773 B2 1/2022 Okoro et al.
11,238,324 B1 2/2022 Marquardt et al.
11,258,302 B1 2/2022 Marquardt et al.
11,704,528 B2 * 7/2023 Marquardt ......... G06K 19/0712 340/572.1
11,714,985 B1 8/2023 Bales et al.
11,757,305 B2 9/2023 Marquardt et al.
11,900,198 B2 2/2024 Marquardt et al.
11,924,908 B1 3/2024 Paczkowski et al.
11,946,766 B1 4/2024 Volkerink et al.
12,073,417 B2 8/2024 Chen
12,155,423 B1 11/2024 Loman et al.
12,164,987 B2 12/2024 Bales et al.
12,197,983 B2 1/2025 Marquardt et al.
12,229,610 B2 2/2025 Bales et al.
12,445,169 B2 10/2025 Bales et al.
12,499,453 B2 12/2025 Chen
12,541,659 B2 2/2026 Balmakhtar et al.
2004/0155778 A1 8/2004 Shek et al.
2005/0151617 A1 7/2005 Nakazawa
2006/0071925 A1 * 4/2006 Wykoff ................ G09G 3/3629 345/211
2006/0134580 A1 6/2006 Raby et al.
2007/0085688 A1 4/2007 Zhu et al.
2007/0205902 A1 9/2007 Cote et al.
2008/0018467 A1 1/2008 Estevez et al.
2008/0122631 A1 * 5/2008 Kodukula .......... G08B 13/2448 340/572.8
2008/0126111 A1 5/2008 Loda
2008/0129457 A1 6/2008 Ritter et al.
2009/0096574 A1 4/2009 Oberle
2009/0315686 A1 12/2009 Oberle
2010/0090004 A1 4/2010 Sands et al.
2010/0102123 A1 * 4/2010 Skowronek .......... G06Q 20/352 235/380
2010/0171586 A1 7/2010 Park et al.
2011/0181399 A1 7/2011 Pollack et al.
2011/0273273 A1 * 11/2011 Liu .................... G06K 19/0724 340/10.1
2012/0018505 A1 * 1/2012 Jiang .................... H01Q 1/2208 235/375
2012/0105210 A1 5/2012 Smith et al.
2012/0126945 A1 5/2012 Kim et al.
2012/0149300 A1 6/2012 Forster
2013/0084796 A1 * 4/2013 Kerr ...................... G06F 1/1654 455/39
2013/0320079 A1 12/2013 Nordin et al.
2014/0044265 A1 2/2014 Kocher et al.
2014/0134468 A1 5/2014 Schaefer et al.
2014/0144994 A1 5/2014 Conner et al.
2015/0048682 A1 2/2015 Murley
2015/0069126 A1 3/2015 Leon
2015/0326543 A1 11/2015 Pochuev et al.
2017/0093896 A1 3/2017 Poornachandran et al.
2017/0270323 A1 9/2017 Butler et al.
2017/0277546 A1 9/2017 Scholze et al.
2017/0329943 A1 11/2017 Choi et al.
2017/0364720 A1 12/2017 Kantor et al.
2018/0070224 A1 3/2018 Park et al.
2018/0107914 A1 4/2018 Ziola
2018/0337776 A1 11/2018 Miller et al.
2019/0005283 A1 1/2019 Nikitin et al.
2019/0034672 A1 1/2019 Rokhsaz
2019/0121576 A1 4/2019 Jean
2019/0138870 A1 5/2019 Kuzbari et al.
2019/0149725 A1 5/2019 Adato et al.
2019/0285724 A1 9/2019 Meadow
2019/0347454 A1 11/2019 Mongrenier et al.
2019/0354824 A1 11/2019 Mohiuddin et al.
2019/0363746 A1 11/2019 Zalewski et al.
2020/0004999 A1 1/2020 Kawaguchi et al.
2020/0180935 A1 6/2020 Zumtobel et al.
2020/0219112 A1 7/2020 Nakayma et al.
2020/0227813 A1 7/2020 Yehezkely
2020/0237032 A1 7/2020 Berlips et al.
2020/0265285 A1 8/2020 Paidimarri et al.
2020/0265446 A1 8/2020 Vargas
2020/0313911 A1 10/2020 Mondello et al.
2021/0019482 A1 1/2021 Shakedd et al.
2021/0019585 A1 1/2021 Shakedd et al.
2021/0027587 A1 1/2021 Yeh et al.
2021/0126623 A1 4/2021 Jeong
2021/0142013 A1 5/2021 Kumar et al.
2021/0203496 A1 7/2021 Cariello et al.
2021/0219102 A1 7/2021 Gion et al.
2021/0224727 A1 7/2021 Rakhunde et al.
2021/0280307 A1 9/2021 Hargrove et al.
2021/0342559 A1 11/2021 Frederick
2022/0043990 A1 2/2022 Pandey et al.
2022/0078779 A1 3/2022 Xu et al.
2022/0109667 A1 4/2022 Gorog
2022/0121894 A1 4/2022 Marquardt et al.
2022/0129721 A1 4/2022 Kim
2022/0171051 A1 6/2022 Cristache et al.
2022/0180141 A1 6/2022 Marquardt et al.
2022/0331841 A1 10/2022 Filler et al.
2022/0344971 A1 10/2022 Marquardt et al.
2022/0374030 A1 11/2022 Lehtonen et al.
2022/0374621 A1 11/2022 Biswas et al.
2023/0011005 A1 1/2023 Khatri et al.
2023/0140778 A1 5/2023 Abotabl et al.
2023/0187811 A1 6/2023 Cohen et al.
2023/0306224 A1 9/2023 Marquardt et al.
2023/0315913 A1 10/2023 Chandra et al.
2023/0351406 A1 11/2023 Marquardt et al.
2023/0359982 A1 11/2023 Mohseni
2024/0015661 A1 1/2024 Wang et al.
2024/0020502 A1 1/2024 Marquardt et al.
2024/0047993 A1 2/2024 Paczkowski et al.
2024/0047994 A1 2/2024 Paczkowski et al.
2024/0088957 A1 3/2024 Wang et al.
2024/0265226 A1 8/2024 Bales et al.
2024/0273313 A1 8/2024 Wang et al.
2024/0330615 A1 10/2024 Balmakhtar et al.
2024/0339867 A1 10/2024 Balmakhtar et al.
2024/0364145 A1 10/2024 Balmakhtar et al.
2024/0394723 A1 11/2024 Chen
2024/0405803 A1 12/2024 Bales et al.
2025/0053769 A1 2/2025 Bales et al.
2025/0094757 A1 3/2025 Marquardt et al.
2025/0148249 A1 5/2025 Bales et al.

(56) References Cited

U.S. PATENT DOCUMENTS

| | | | |
|---|---|---|---|
| 2026/0005727 | A1 | 1/2026 | Bales et al. |
| 2026/0134237 | A1 | 5/2026 | Balmakhtar et al. |

FOREIGN PATENT DOCUMENTS

| | | | |
|---|---|---|---|
| EP | 4172863 | A1 | 5/2023 |
| EP | 4205031 | A1 | 7/2023 |
| EP | 4278425 | A1 | 11/2023 |
| EP | 4429076 | A1 | 9/2024 |
| EP | 4443327 | A1 | 10/2024 |
| EP | 4446939 | A1 | 10/2024 |
| EP | 4455934 | A1 | 10/2024 |
| EP | 4471660 | A1 | 12/2024 |
| EP | 4519805 | | 3/2025 |
| EP | 4537240 | | 4/2025 |
| EP | 4662581 | | 12/2025 |
| EP | 4760589 | A2 | 6/2026 |
| WO | 2008051598 | A2 | 5/2008 |
| WO | 2008055212 | A2 | 5/2008 |
| WO | 20110160007 | A2 | 12/2011 |
| WO | 2015187199 | A1 | 12/2015 |
| WO | 2018063449 | A1 | 4/2018 |
| WO | 2018132120 | A1 | 7/2018 |
| WO | 20190149341 | A1 | 8/2019 |
| WO | 20200208412 | A1 | 10/2020 |
| WO | 2022060475 | A1 | 3/2022 |
| WO | 2022125162 | A1 | 6/2022 |
| WO | 2022231682 | A1 | 11/2022 |
| WO | 20220268331 | A1 | 12/2022 |
| WO | 20240167584 | A1 | 8/2024 |

OTHER PUBLICATIONS

Office Action dated Apr. 8, 2024, U.S. Appl. No. 17/165,877, filed Feb. 7, 2023.

Tahir, M., et al. "An Approach for Managing Manufacturing Assets through Radio Frequency Energy Harvesting". Future and Automation Systems and Technologies Laboratory, Jan. 2019.

Notice of Allowance dated Apr. 19, 2024, U.S. Appl. No. 17/734,555, filed May 2, 2022.

Foreign Communication From a Related Counterpart Application, EP Extended Search Report and EP Search Opinion dated Aug. 16, 2024, EP Application No. 24165554.7.

Foreign Communication From a Related Counterpart Application, EP Extended Search Report and EP Search Opinion dated Sep. 2, 2024, EP Application No. 24165153.8.

Foreign Communication From a Related Counterpart Application, EP Extended Search Report and EP Search Opinion dated Sep. 18, 2024, EP Application No. 24169545.1.

Foreign Communication From a Related Counterpart Application, EP Extended Search Report and EP Search Opinion dated Oct. 15, 2024, EP Application No. 24175267.4 .

Bales, Mark R., et al., "System and Method of Controlling Unique Identities of Ambient Electromagnetic Power Harvesting Chips," filed Oct. 28, 2024, U.S. Appl. No. 18/929,569.

Balmakhtar, Marouane, et al., "Location Detection and Tracking Using Ambient Electromagnetic Power Harvesting," filed Apr. 25, 2023, U.S. Appl. No. 18/306,934.

Office Action dated Apr. 30, 2020, U.S. Appl. No. 16/158,299, filed Oct. 12, 2018.

Notice of Allowance dated Oct. 30, 2020, U.S. Appl. No. 16/158,299, filed Oct. 12, 2018.

Notice of Allowance dated Oct. 5, 2021, U.S. Appl. No. 17/024,484, filed Sep. 17, 2020.

Notice of Allowance dated Oct. 21, 2021, U.S. Appl. No. 17/240,846, filed Apr. 26, 2021.

Notice of Allowance dated Mar. 7, 2023, U.S. Appl. No. 17/568,019, filed Jan. 4, 2022.

Notice of Allowance dated May 3, 2023, U.S. Appl. No. 17/867,218, filed Jul. 18, 2022.

Office Action dated May 11, 2023, U.S. Appl. No. 17/161,415, filed Jan. 28, 2021.

Office Action dated Sep. 14, 2023, U.S. Appl. No. 17/161,415, filed Jan. 28, 2021.

Office Action dated Jun. 20, 2023, U.S. Appl. No. 17/115,596, filed Dec. 8, 2020.

Notice of Allowance dated Sep. 27, 2023, U.S. Appl. No. 17/115,596, filed Dec. 8, 2020.

Notice of Allowance dated May 11, 2023, U.S. Appl. No. 17/571,294, filed Jan. 7, 2022.

Office Action dated Oct. 17, 2023, U.S. Appl. No. 17/165,877, filed Feb. 7, 2023.

Foreign Communication From a Related Counterpart Application, International Search Report and Written Opinion dated Nov. 23, 2021, International Application No. PCT/US2021/044086 filed on Jul. 31, 2021.

Foreign Communication From a Related Counterpart Application, International Search Report and Written Opinion dated Dec. 6, 2021, International Application No. PCT/US2021/051159 filed on Sep. 20, 2021.

Foreign Communication From a Related Counterpart Application, Invitiation to Pay Additional Fees dated May 30, 2022, International Application No. PCT/US2022/017304.

Foreign Communication From a Related Counterpart Application, International Search Report and Written Opinion dated Jul. 21, 2022, International Application No. PCT/US2022/017304.

Foreign Communication From a Related Counterpart Application, International Search Report and Written Opinion dated May 3, 2023, International Application No. PCT/US2023/014517.

Foreign Communication From a Related Counterpart Application, International Search Report and Written Opinion dated Sep. 26, 2023, International Application No. PCT/US2023/067789.

Loman, Clinton H., et al., "Battery Coupled Radio Frequency Identity (RFID)," filed Jan. 28, 2021, U.S. Appl. No. 17/161,415.

Marquardt, Ronald, R., et al., "Multi-tier Identities in an RFID Chip," filed Dec. 8, 2020, U.S. Appl. No. 17/115,596.

Marquardt, Ronald, R., et al., "RFID Device with Two-Stage Power Harvesting," filed Jul. 31, 2021, International Application No. PCT/US2021/044086.

Marquardt, Ronald, R., et al., "Multi-tier Identities in an RFID Chip," filed Sep. 20, 2021, International Application No. PCT/US2021/051159.

Marquardt, Ronald, R., et al., "Ambient Electromagnetic Power Harvesting Chip Adaptation Based on Available Power Level," filed Jan. 7, 2022, U.S. Appl. No. 17/571,294.

Marquardt, Ronald, R., et al., "Ambient Electromagnetic Power Harvesting Chip Adaptation Based on Available Power Level," filed Feb. 22, 2022, International Application No. PCT/US2022/017304.

Bales, Mark, R., et al., "System and Method of Controlling Unique Identities of Ambient Electromagnetic Power Harvesting Chips," filed Jul. 18, 2022, U.S. Appl. No. 17/867,218.

Bales, Mark, R., et al., "System and Method of Controlling Lifecycles of Ambient Electromagnetic Power Harvesting Chips," filed Feb. 7, 2023, U.S. Appl. No. 18/165,877.

Bales, Mark, R., et al., "System and Method of Controlling Unique Identities of Ambient Electromagnetic Power Harvesting Chips," filed Jun. 1, 2023, International Application No. PCT/US2023/067789.

Bales, Mark R., et al., "System and Method of Controlling Unique Identities of Ambient Electromagnetic Power Harvesting Chips," filed Jun. 9, 2023, U.S. Appl. No. 18/332,284.

Balmakhtar, Marouane, et al., "Differentiated and Modulated Spectrum Power Radiation Via MIMO and Beamforming Imposed Upon Ambient Electromagnetic Power Harvesting Chips," filed Apr. 3, 2023, U.S. Appl. No. 18/295,075.

Chen, Zhisheng, "Anti-counterfeiting System for Bottled Products," filed May 2, 2022, U.S. Appl. No. 17/734,555.

Chen, Zhisheng, "Anti-counterfeiting System for Bottled Products," filed Mar. 3, 2023, International Application No. PCT/US2023/014517.

Balmakhtar, Marouane, et al., "Device and Method for Controlling a Physical Indicator of an Ambient Electromagnetic Power Harvesting Device," filed Apr. 10, 2023, U.S. Appl. No. 18/298,253.

(56) References Cited

OTHER PUBLICATIONS

Marquardt, Ronald, R., et al., "RFID Device with Two-Stage Power Harvesting," filed May 24, 2023, U.S. Appl. No. 18/323,268.
"Bales, Mark, R., et al., ""Ambient Electromagnetic Power Harvesting Device for Collecting and Forwarding Data,"" filed May 30, 2023, U.S. Appl. No. 18/325,936."
Restriction Requirement dated Apr. 1, 2025, U.S. Appl. No. 18/295,075, filed Apr. 3, 2023.
Marquardt, Ronald, R., et al., "RFID Device with Two-Stage Power Harvesting," filed Dec. 3, 2024 U.S. Appl. No. 18/967,600.
Bales, Mark, R., et al., "System and Method of Controlling Lifecycles of Ambient Electromagnetic Power Harvesting Chips," filed Jan. 10, 2025 , U.S. Appl. No. 19/017,214.
Notice of Allowance dated Oct. 15, 2024, U.S. Appl. No. 17/165,877, filed Feb. 7, 2023.
Notice of Allowance dated Sep. 13, 2024, U.S. Appl. No. 18/323,268, filed May 24, 2023.
Notice of Allowance and Fee(s) dated Jul. 18, 2024, U.S. Appl. No. 17/161,415, filed Jan. 28, 2021.
Notice of Allowance dated Jul. 30, 2024, U.S. Appl. No. 18/332,284, filed Jun. 9, 2023.
Chen, Zhisheng, "Anti-counterfeiting System for Bottled Products," filed Jul. 12, 2024, U.S. Appl. No. 18/772,096.
Office Action dated Jan. 8, 2024, U.S. Appl. No. 17/734,555, filed May 2, 2022.
Notice of Allowance dated Jun. 18, 2025, U.S. Appl. No. 18/325,936, filed May 30, 2023.
Office Action dated Jun. 30, 2025, U.S. Appl. No. 18/306,934, filed Apr. 25, 2023.
Ponnimbaduge, T.D., et al. "Simultaneous Wireless Information and Power Transfer (SWIPT): Recent Advances and Future Challenges." IEEE Communications Surveys & Tutorials, vol. 20, No. 1, pp. 264-302, 2018.
Final Office Action dated Nov. 19, 2005, U.S. Appl. No. 18/306,934, filed Apr. 25, 2003.
Advisory Action dated Feb. 6, 2026, U.S. Appl. No. 18/306,934, filed Apr. 25, 2023.
Office Action dated Dec. 31, 2025, U.S. Appl. No. 19/017,214, filed Jan. 10, 2025.
Office Action dated Jan. 28, 2026, U.S. Appl. No. 18/298,253, filed Apr. 10, 2023.
Woolley, M. (Oct. 26, 2017). "Bluetooth Core Specification Version 5.0 Feature Enhancements". bluetooth.com (1.1.0 ed.)., [online] Retrieved form the internet: <https://web.archive.org/web/20190718114224/https://www.bluetooth.com/wp-content/uploads/2019/03/Bluetooth_5-Final.pdf>, 2017.
Bales, Mark, R., et al., "Ambient Electromagnetic Power Harvesting Device for Collecting and Forwarding Data," filed Sep. 6, 2025, U.S. Appl. No. 19/321,172.
Balmakhtar, Marouane, et al., "Differentiated and Modulated Spectrum Power Radiation Via MIMO and Beamforming Imposed Upon Ambient Electromagnetic Power Harvesting Chips," filed Jan. 9, 2026, U.S. Appl. No. 19/445,403.
Office Action dated Feb. 19, 2026, U.S. Appl. No. 18/967,600, filed Dec. 3, 2024.
Office Action dated Feb. 19, 2026, U.S. Appl. No. 18/929,569, filed Oct. 28, 2024.
Office Action dated Aug. 11, 2025, U.S. Appl. No. 18/295,075, filed Apr. 3, 2023.
Notice of Allowance dated Oct. 9, 2025, U.S. Appl. No. 18/295,075, filed Apr. 3, 2023.
Notice of Allowance dated Aug. 22, 2025, U.S. Appl. No. 18/772,096, filed Jul. 12, 2024.
Notice of Allowance dated Jun. 5, 2026, U.S. Appl. No. 18/967,600, filed Dec 3, 2024.
Notice of Allowance dated May 26, 2026, U.S. Appl. No. 18/298,253, filed Apr. 10, 2023.
Foreign Communication From a Related Counterpart Application, EP Extended Search Report and EP Search Opinion dated May 19, 2026, EP Application No. 26152454.0.
Notice of Allowance dated Jul. 22, 2026, U.S. Appl. No. 19/017,214, filed Jan. 10, 2025.
Notice of Allowance dated Jul. 14, 2026, U.S. Appl. No. 18/929,569, filed Oct. 28, 2024.

* cited by examiner

MULTI-TIER IDENTITIES IN AN RFID CHIP

CROSS-REFERENCE TO RELATED APPLICATIONS

This application is a continuation of and claims priority under 35 U.S.C. § 120 to U.S. patent application Ser. No. 17/115,596 filed on Dec. 8, 2020, entitled "Multi-tier Identities in an RFID Chip" by Ronald R. Marquardt, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips conventionally are small inexpensive semiconductor devices that have no on-board power. When irradiated with an appropriate electromagnetic signal, the RFID chip draws power from the energy in the electromagnetic signal and wirelessly transmits an identity via a radio frequency. RFID chips may be coupled to or sewn into clothing. RFID chips may be embedded in or adhered to products. Special scanning or reading devices may be used to stimulate the RFID chips with an electromagnetic signal, read the identity broadcast by the RFID chips, and provide this identity back to a computer that the scanning or reading device is communicatively coupled to. Conventional RFID chips may be used in inventory control systems and in other applications.

SUMMARY

In an embodiment, a radio frequency identity (RFID) chip is disclosed. The RFID chip comprises a processor, a radio transceiver communicatively coupled to the processor, a non-transitory memory that stores a generic identity shared with a plurality of other RFID chips and a unique identity that is not shared with other RFID chips, and an application stored in the non-transitory memory. When executed by the processor, the application receives a first query for identity from the radio transceiver received on a first frequency band by the radio transceiver and, in response to the first query for identity, reads the generic identity from the non-transitory memory and causes the radio transceiver to transmit the generic identity on the first frequency band. The application further detects via the radio transceiver radio signals in the first frequency band and stores information about the radio transceiver radio signals in the first frequency band in the non-transitory memory. The application further receives a second query for identity from the radio transceiver received on a second frequency band by the radio transceiver, where the second frequency band is different from the first frequency band and, in response to the second query for identity, reads the unique identity from the non-transitory memory and causes the radio transceiver to transmit the unique identity on the second frequency band. The application further receives a request to upload stored information from the radio transceiver received on the second frequency band, wherein the request to upload provides the unique identity, in response to the request to upload stored information, reads the information about the radio transceiver radio signals in the first frequency band from the non-transitory memory and causes the radio transceiver to transmit the information stored about the radio transceiver radio signals in the first frequency band read from the non-transitory memory on the second frequency band, and after transmitting the information stored about the radio transceiver radio signals, deletes the information about the radio transceiver radio signals in the first frequency band from the non-transitory memory.

In another embodiment, a radio frequency identity (RFID) chip is disclosed. The RFID chip comprises a processor, a radio transceiver communicatively coupled to the processor, a non-transitory memory that stores a generic identity shared with a plurality of other RFID chips and a unique identity that is not shared with other RFID chips, and an application stored in the non-transitory memory. When executed by the processor, the application receives a first query for identity from the radio transceiver received on a first frequency band by the radio transceiver, and in response to the first query for identity, reads the generic identity from the non-transitory memory and causes the radio transceiver to transmit the generic identity on the first frequency band. The RFID chip further receives a second query for identity from the radio transceiver received on a second frequency band by the radio transceiver, where the second frequency band is different from the first frequency band and, in response to the second query for identity, reads the unique identity from the non-transitory memory and causes the radio transceiver to transmit the unique identity on the second frequency band.

In yet another embodiment, a method of logging information detected in a first frequency band by a radio frequency identity (RFID) chip and transmitting the logged information in a second frequency band by the RFID chip when requested by a reader via the second frequency band is disclosed. The method comprises receiving information by an application executing on a processor of a radio frequency identity (RFID) chip from a radio transceiver of the RFID chip, where the radio transceiver receives the information in a first frequency band and storing the information by the application in a non-transitory memory of the RFID chip. The method further comprises receiving an authentication message by the radio transceiver in a second frequency band from a reader, authenticating the authentication message by the application, reading the information stored in the non-transitory memory by the application, and transmitting the information read from the non-transitory memory by the application via the radio transceiver in the second frequency band to the reader.

In yet another embodiment, a method of transmitting a first tier of information by a radio frequency identity (RFID) chip when hailed in a first frequency band and transmitting a second tier of information by the RFID chip when hailed in a second frequency band is disclosed. The method comprises receiving a first radio signal in a first frequency band by an application executing on a processor of a radio frequency identity (RFID) chip, where the first radio signal hails the RFID chip to transmit information and, in response to receiving the first radio signal, transmitting a first tier of information stored in the RFID chip in the first frequency band by the application. The method further comprises receiving a second radio signal in a second frequency band by the application, where the second radio signal hails the RFID chip to transmit information and, in response to receiving the second radio signal, transmitting a second tier of information stored in the RFID chip in the second frequency band by the application, wherein the second tier of information contains different information than the first tier of information contains.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
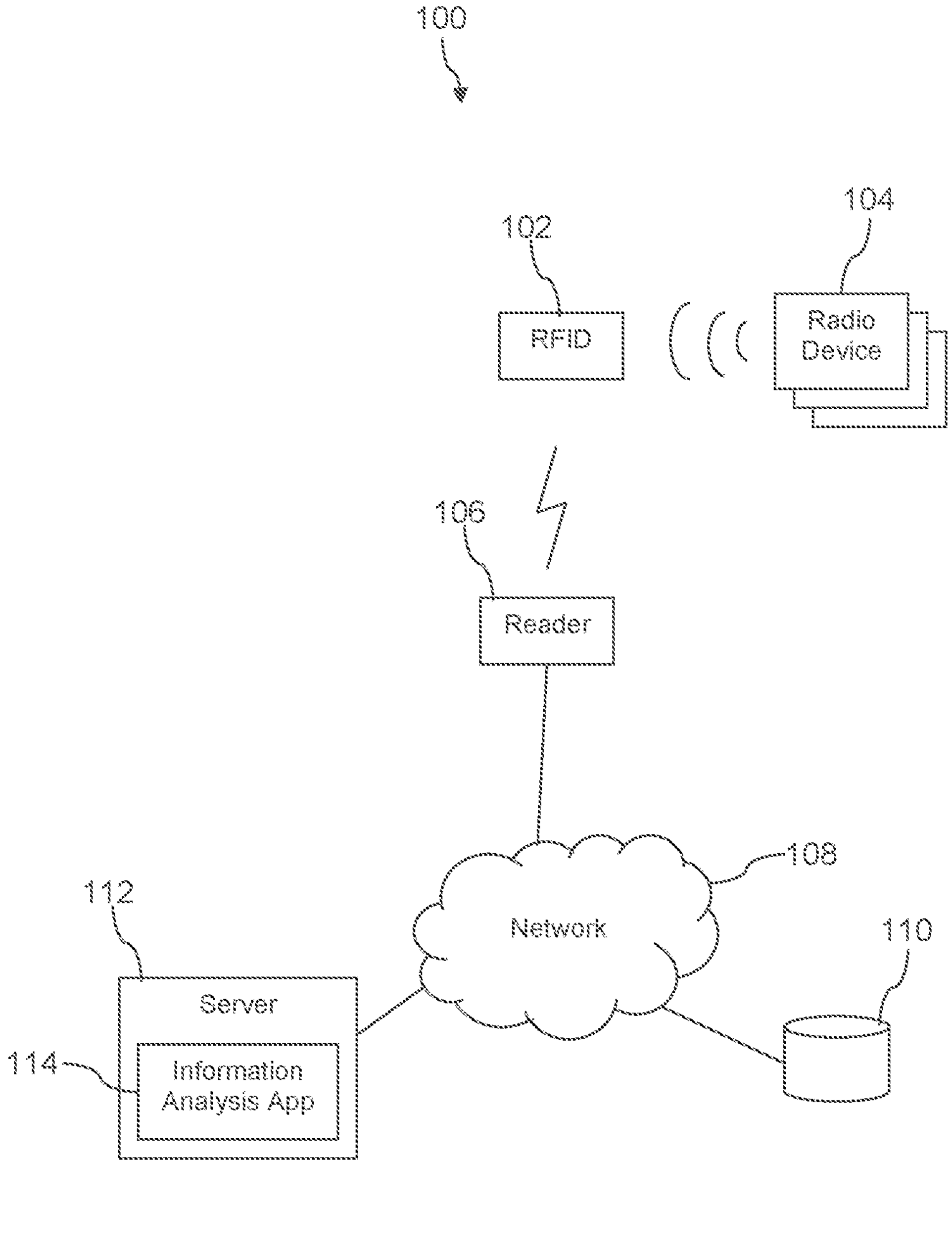
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a new radio frequency identity (RFID) chip that provides selective multi-tier functionality responsive to what frequency band it is hailed on by a scanner or a reader device. The selective multi-tier functionality RFID chip taught herein is a particular solution to a technical problem. Conventional RFID chips or RFID tags are single function devices and reveal their identity in an unrestricted way. This can present a security problem in sensitive environments, for example in a medical care facility such as a hospital. By contrast the RFID chip disclosed herein shares a generic identity when hailed in a first frequency band and shares a unique and possibly confidential identity when hailed in a second frequency band. The generic identity and the unique identity returned by the RFID chip may be referred to as multi-tier information or multi-tier identities.

In an embodiment, the RFID chip shares its unique identity only after completing a process of authenticating the scanner or reader device that is querying its unique identity, thereby providing yet more security. The scanner or reader device may provide an authentication key, and the RFID chip may compare the received authentication key with a stored authentication key. If the two keys match, the scanner or reader device is deemed to have successfully authenticated itself, otherwise the scanner or reader device fails authentication.

In an embodiment, a two step process of authentication may be conducted. In this embodiment, the RFID chip may provide a seed or a nonce value along with its generic identity when hailed in the first frequency band by the scanner or reader device. When the scanner or reader device hails the RFID chip in the second frequency band, it provides a hashed value of the seed or nonce value received along with the generic identity in the first frequency band. The RFID chip hashes the seed or nonce value according to the same hashing method and compares its own generated hash value to the hash value provided by the scanner or reader device. If the two hash values are identical, the RFID chip engages the scanner or reader device to complete the second stage of authentication by providing the authentication key described above. The two step process of authentication can provide the benefit of increased security and reduces the risk of replay authentication spoofing.

Another form of multi-tier functionality selected based on frequency band involves the RFID chip capturing information about radio signals in a first frequency band, storing that information with a time and date stamp, and then uploading that captured information to a scanner or a reader device that queries in a second different frequency band, perhaps after completing an authentication process. This selective multi-tier functionality can be used in a medical care facility to track and monitor use of personal protective equipment, diagnostic samples, patients receiving medical care. This selective multi-tier functionality can be used in contact tracing.

In an embodiment, the RFID chip taught herein receives power from an energizing electromagnetic signal. The RFID chip may receive power in the second frequency band, for example in a frequency band in the range of 47 GHz to 60 GHz. Some of these frequency bands in this range may be unregulated, and hence the scanner or reader device may emit a relatively high power in this frequency band that is able to power the RFID chip from a greater distance than conventional RFID scanners or reader devices. Additionally, the greater power in the second frequency band can support the RFID chip transmitting more detailed information to the scanner or reader device and/or transmitting the information at a higher bit rate.

The RFID chip may also receive power in the 1.9 GHz cellular radio band and/or from the conventional RFID frequency band 946 MHz to 948 MHz. The RFID chip may respond to queries in the 946 MHz to 948 MHz band or in the 1.9 GHz cellular radio bands by providing its generic identity—such as "I am a blood sample," "I am a urine sample," "I am a nurse's badge," "I am a disposable face mask" without providing a unique identity. By contrast, if queried (possibly after completing an authentication process) by a scanner or reader device in the second frequency band by providing its unique identity such as "I am Dale G. Parker's blood sample #3," "I am Mary Z. Green's urine sample #7," "I am nurse Smith's badge," or "I am disposable face mask 37201."

Additionally, the RFID chip may upload information it has collected from its radio environment to the scanner or reader device that queries it (possibly after completing an authentication process) in the second frequency band. This information may be a list of beacon radio signals detected by the RFID chip along with a time stamp. This information may be a list of identities of other RFID chips that have responded to queries and have been overheard by the selective multi-tier functionality RFID chip and a time stamp when overheard. After uploading this information to the scanner or reader device, the RFID chip may delete this information from its memory, whereby to avoid overrunning limited memory. In an embodiment, the roles or functionality tiers associated with the first frequency band may be associated to a different third frequency band, and the roles associated with the second frequency band may be associated to a fourth frequency band. Said in other words, the frequency band associated with the first role or tier of functionality may be reconfigured over time, and the frequency band associated with the second role or tier of functionality may be reconfigured over time.

Turning now to FIG. 1, a system 100 is described. In an embodiment, the system 100 comprises a multi-tier functionality RFID chip 102, one or more radio devices 104, a reader device 106, a network 108, and a data store 110. The multi-tier functionality RFID chip 102 detects and/or receives radio and/or electromagnetic signals emitted by radio devices 104 in a first radio frequency band and stores information about what it detects in a memory. In an embodiment, the radio devices 104 may emit electromagnetic signals in the 946 MHz to 948 MHz frequency band. In an embodiment, the radio devices 104 may emit electromagnetic signals in a different frequency band less than 4 GHz.

When queried by the reader 106 in a second radio frequency band, the multi-tier functionality RFID chip 102 may wirelessly transmit the information it stored via the second radio frequency band to the reader 106. In an embodiment, the reader 106 communicates with the RFID 102 in a frequency band in the range 47 GHz to 60 GHz. In an embodiment, the reader 106 communicates with the RFID 102 in a frequency band in a range from greater than 4 GHz and less than 100 GHz. Before responding to the query from the reader 106, the multi-tier functionality RFID chip 102 may challenge the reader 106 to authenticate itself by completing an authentication handshake process with the multi-tier functionality RFID chip 102. The authentication handshake process may involve the reader 106 transmitting a secret such as an access token or an access key to the multi-tier functionality RFID chip 102. The multi-tier functionality RFID chip 102 may compare the received secret to a stored copy of the secret to authenticate the reader 106. In the interest of concision, the multi-tier functionality RFID chip 102 is referred to hereinafter as the RFID 102, except when confusion may result, in which case the fuller expression is employed.

The network comprises one or more public networks, one or more private networks, or a combination thereof. The radio devices 104 may comprise radio beacons, conventional RFID chips, and/or conventional RFID scanners or RFID reader devices. The information that the RFID 102 transmits to the reader 106 may comprise identities of radio devices 104 (e.g., identities of beacons, identities of other RFID devices, identities of readers). In an embodiment, the RFID 102 has no internal power source and harvests power from ambient electromagnetic waves and/or radio waves. In an embodiment, the RFID 102 harvests power from ambient cellular radio communication radio waves. For further details on an RFID device that harvests power from ambient cellular radio communication radio waves see U.S. patent application Ser. No. 17/024,484, filed Sep. 17, 2020, titled "RFID Device with Two-Stage Power Harvesting," by Ronald R. Marquardt, et al., which is incorporated herein by reference in its entirety. In an embodiment, the RFID 102 harvests power from ambient electromagnetic waves emitted in a 850 MHz frequency band, a 1900 MHz frequency band, a 2800 MHz frequency band, or a 3900 MHz frequency band. In an embodiment, the RFID 102 additionally harvests power from electromagnetic energy emitted by the reader 106. In an embodiment, the RFID 102 harvests power emitted by the reader 106 in a frequency band in the range 47 GHz to 60 GHz. One or more frequency bands in the 47 GHz to 60 GHz frequency range may not be regulated by the FCC, and hence emitting relatively high power signals in this frequency band may not violate anti-interference regulations and/or requirements. In another embodiment, however, the RFID 102 comprises an electric battery and receives power from the electric battery.

The higher power emitted by the reader 106 in the range 47 GHz to 60 GHz may promote the reader 106 communicating with the RFID 102 at a greater distance, for example at a distance up to 5 feet, a distance up to 10 feet, a distance up to 15 feet, a distance up to 20 feet, a distance up to 25 feet, a distance up to 30 feet, a distance up to 35 feet, a distance up to 40 feet, a distance up to 45 feet, a distance up to 50 feet, or a distance up to 100 feet. It is understood that conventional RFID chips are restricted to communicating over a relatively short distance, for example over a distance of less than 5 feet or over a distance of less than 2 feet.

In an embodiment, when the RFID 102 is requested to share its identity with a radio device 104 communicating in the first frequency band, the RFID 102 reads a generic identity from its memory and transmits this generic identity on the first frequency band to the requesting radio device 104. In an embodiment, the first frequency band may be a 946 MHz to 948 MHz frequency band. This generic identity may identify a role played by the RFID 102 or a role played by an artifact with which the RFID 102 is associated, for example an article the RFID 102 is sewn into or is adhered to. In a medical care environment, such a generic identity may be, for example, "patient wristband," "nurse badge," "doctor badge," "blood sample," "urine sample," or "facemask."

When the RFID 102 is requested to share its identity with the reader 106 communicating in the second frequency band, the RFID 102 reads a unique identity from its memory and transmits this unique identity on the second frequency band to the reader 106. In an embodiment, the second frequency band may be a frequency band in the frequency range 47 GHz to 60 GHz. The unique identity may be a unique identity that distinguishes between a first instance of an RFID 102 having a first generic identity and a second instance of an RFID 102 having the same first generic identity. For example, the unique identity of a first RFID 102 having a generic identity of "patient wristband" may be "Robert Z. Brown" and the unique identity of a second RFID 102 having the generic identity of "patient wristband" may be "Rudolph B. Klimpschberger." The unique identity may be a unique number rather than a text string. In an embodiment, the unique identity may be mapped by the data store 110 to further details such as a name, a history of interactions of the RFID 102 with radio devices 104 and/or the reader 106. In an embodiment, the unique identity is not globally unique (e.g., unique and different from all other identities on the Earth) but unique within a particular domain. In an embodiment, the unique identity distinguishes one patient wristband from other patient wristbands within a domain (e.g., within the same hospital or system of hospitals), distinguishes one nurse badge from other nurse badges within the domain, distinguishes one doctor badge from other doctor badges within the domain, distinguishes one blood sample from other blood samples within the domain, or distinguishes one urine sample from other urine samples within the domain.

The reader 106 is communicatively coupled to the network 108 and transmits the information received from the RFID 102 via the network 108 to the data store 110. The reader 106 may be communicatively coupled to the network 108 by a wired link or by a wireless link, for example via a cell site. The system further comprises a server 112 that executes an information analysis application 114 that accesses the information stored in the data store 110 by the reader 106 and analyzes that information. The information analysis application 114 can support a plurality of different use cases. The server 112 may be implemented as a computer system. Computer systems are described further hereinafter.

In a first use case, the RFID 102 can be associated with a patient wristband in a hospital. When the RFID 102 detects a radio signal emitted by a radio device 104 associated with a nurse, for example a multi-tier functionality RFID chip like RFID 102, a conventional RFID chip, or another radio device 104 coupled to a nurse's badge, the RFID 102 records information about the detected radio signal. For example, the RFID 102 records a generic identity broadcast by the radio device 104 and/or a unique identity broadcast by the radio device 104. In an embodiment, the RFID 102 records the information along with date-time of the detection.

In an embodiment, the reader 106 may be located at an exit of a hospital. In an embodiment, the reader 106 may be located at an entrance of a department of a hospital such as an entrance to a recovery room, an entrance to intensive care, an entrance to surgery, an entrance to an X-ray imaging room, an entrance to a CAT scan imaging room, or another department of a hospital. The reader 106 may add a record of its own identity and a date-time to the records or information received from the RFID 102 when storing the information in the data store 110.

This information, after storing in the data store 110, may be analyzed by the information analysis application 114 to infer that the patient bearing the wristband associated with the RFID 102 was visited by a nurse and/or by a particular nurse at the indicated date-time. Likewise, when the RFID 102 detects a radio signal emitted by a radio device 104 associated with a doctor, the RFID 102 records information about that detected radio signal and a date-time of the detection. This information, conveyed to the reader 106 and stored in the data store 110, may be analyzed by the information analysis application 114 to infer that the patient bearing the wristband associated with the RFID 102 was visited by a doctor and/or by a particular doctor at the indicated date-time. When the RFID 102 detects a radio signal emitted by a radio device 104 that is a beacon located at the entrance of the recovery room of the hospital, the RFID 102 records information about that detected radio signal and a date-time of the detection.

This information, conveyed to the reader 106 and stored in the data store 110, may be analyzed by the information analysis application 114 to infer that the patient bearing the wristband associated with the RFID 102 was rolled into the recovery room (for example, after knee replacement surgery) at the indicated date-time. This analysis can be used to generate a history of the patient within the medical care facility during a period of admittance, and the history of the patient stored in the data store 110. It is understood that this simple example can be extended with a variety of other distinct interactions, for example interactions with diagnostic equipment, food service, etc.

In a second use case, the RFID 102 can be associated with a DNA sample or a diagnostic sample, for example a blood sample, a urine sample, a biopsy sample, or other sample. The RFID 102 can maintain a history or log of radio signals it has detected emitted by radio devices 104 and upload this to the reader 106 when appropriately requested. In a manner like that described above with reference to a medical care environment, the RFID 102 can provide a bread crumb trail that can be analyzed to track a chain of custody of the sample. For example, this history can identify a person who collected the sample, a person who transported the sample, a location where the sample was stored, a location where the sample was analyzed. This kind of automated detection and tracking of interactions with radio devices 104 can provide a higher level of confidence in the integrity of DNA samples and of diagnostic samples.

Figure 2:
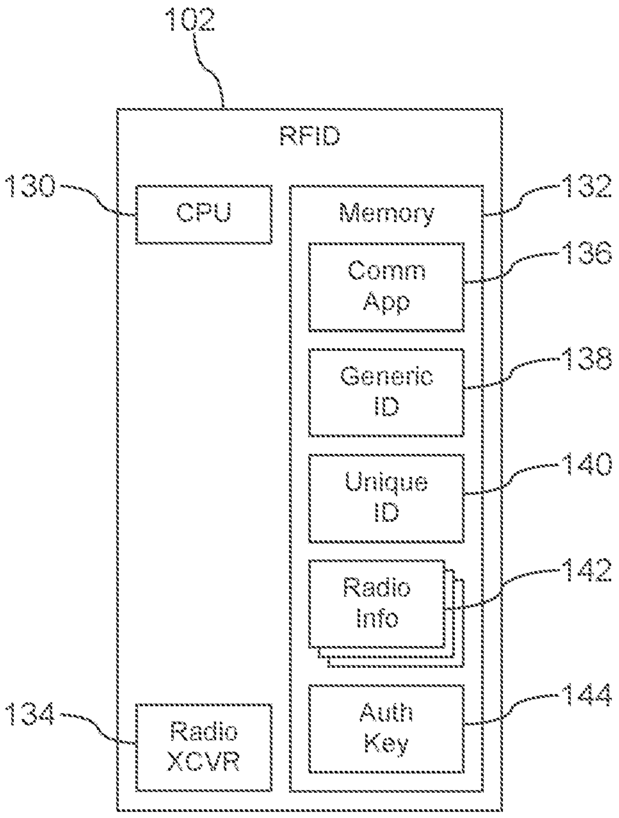
FIG. 2 is a block diagram of a radio frequency identity (RFID) chip according to an embodiment of the disclosure.

Turning now to FIG. 2, further details of the multi-function RFID chip 102 are described. In an embodiment, the RFID 102 comprises a processor 130, a memory 132, and a radio transceiver 134. In an embodiment, the radio transceiver 134 or the RFID 102 comprises two radio transceivers, a first radio transceiver operable to receive and transmit in the first frequency band and a second radio transceiver operable to receive and transmit in the second frequency band. The memory 132 comprises a non-transitory portion that stores a communication application 136, a generic identity 138, and a unique identity 140. As the RFID 102 detects radio devices 104 on the first frequency band as described above with reference to FIG. 1, the communication application 136, executing on the processor 130, creates radio information records 142 about the detection events and stores them in the non-transitory portion of the memory 132. In an embodiment, the non-transitory portion of the memory 132 further comprises an authorization key 144 that may be used to authenticate the reader 106.

The communication application 136 detects when the reader 106 hails it on the second frequency band, and it optionally challenges the reader 106 to authenticate itself by transmitting a secret to the RFID 102, for example a token or an authentication key. If the reader 106 successfully authenticates (or if no authentication process is performed by the communication application 136), the RFID 102 responds to requests from the reader 106. Using the second frequency band, the reader 106 may request the unique identity 140 and/or the generic identity 138 of the RFID 102. The communication application 136 accesses the unique identity 140 and/or the generic identity 138 and transmits this identity or identities via the radio transceiver 134 on the second frequency band to the reader 106. Using the second frequency band, the reader 106 may request the RFID 102 to transmit the radio information records 142 accumulated by the RFID 102. The communication application 136 may access the stored radio information records 142 and transmit the radio information records 142 via the radio transceiver 134 on the second frequency band to the reader 106. After transmitting the radio information records 142, the communication application 136 optionally deletes the radio information records 142 from the non-transitory portion of the memory 132, whereby to conserve limited space in the non-transitory portion of the memory 132 available for such records. In an embodiment, the RFID 102 waits for the reader 106 to acknowledge receipt of the radio information 142 before deleting them from the non-transitory portion of the memory 132.

Figure 3:
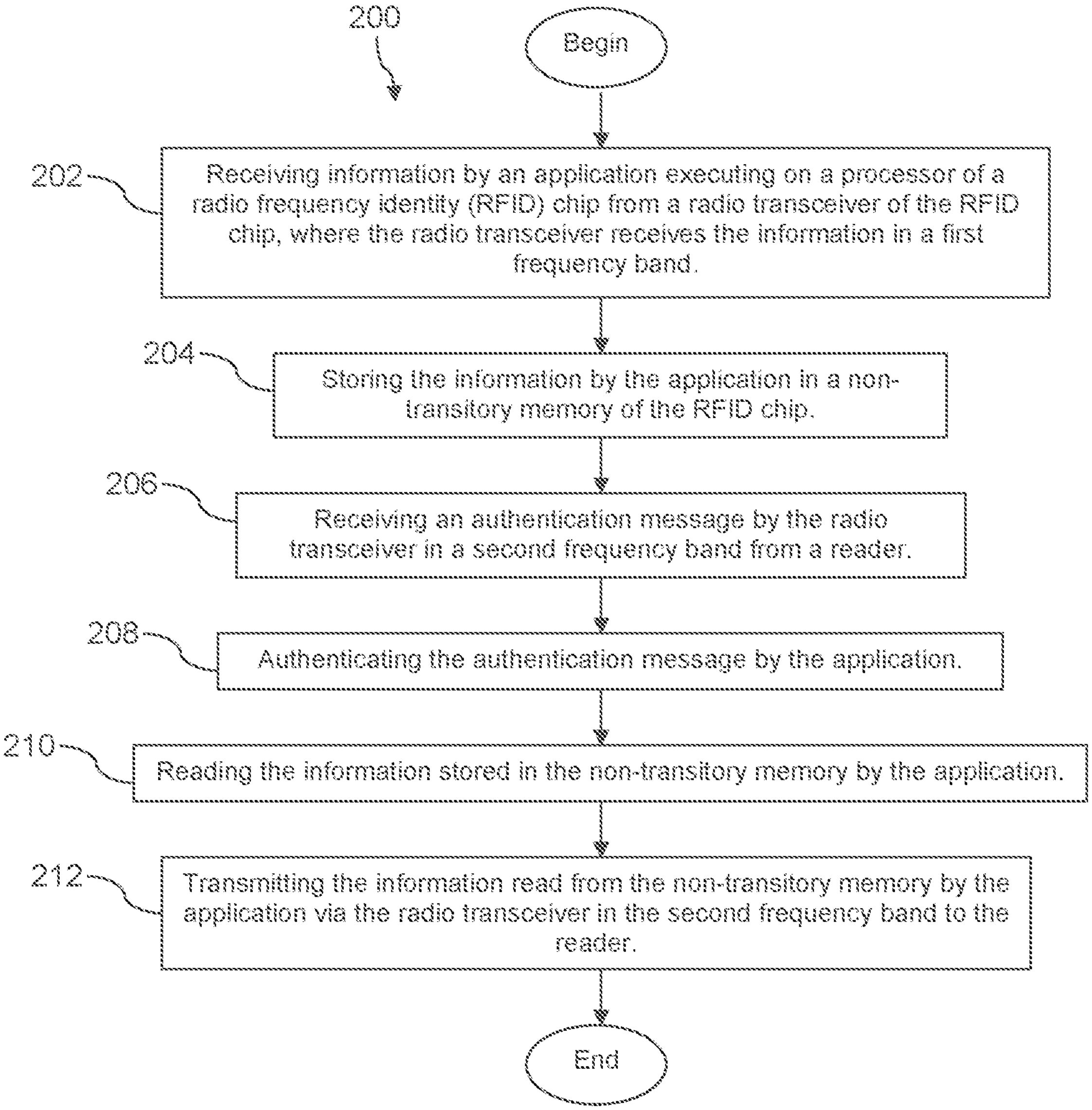
FIG. 3 is a flow chart of a method according to an embodiment of the disclosure.

Turning now to FIG. 3 a method 200 is described. In an embodiment, method 200 is a method of logging information detected in a first frequency band by a radio frequency identity (RFID) chip and transmitting the logged information in a second frequency band by the RFID chip when requested by a reader via the second frequency band. In an embodiment, the RFID chip receives power from ambient electromagnetic waves. At block 202, the method 200 comprises receiving information by an application executing on a processor of a radio frequency identity (RFID) chip from a radio transceiver of the RFID chip, where the radio transceiver receives the information in a first frequency band. In an embodiment, the first frequency band comprises a 946 MHz to 948 MHz frequency band.

At block 204, the method 200 comprises storing the information by the application in a non-transitory memory of the RFID chip. In an embodiment, the information stored by the application comprises identities of beacons detected by the RFID chip and a date-time of detection. In an embodiment, the information stored by the application comprises identities of other RFID chips detected by the RFID chip and a date-time of detection. In an embodiment, wherein the information stored by the application comprises identities of readers that queried the RFID chip on the first frequency band and a date-time of the queries. At block 206, the method 200 comprises receiving an authentication message by the radio transceiver in a second frequency band from a reader or a scanner. In an embodiment, the second frequency band is in the frequency range of 47 GHz to 60 GHz. In an embodiment, the reader is located at an exit of a hospital. In an embodiment, the reader is located at an entrance of a department of a hospital, for example an entrance to a recovery room, an entrance to intensive care, an entrance to surgery, an entrance to an X-ray imaging room, an entrance to a CAT scan imaging room, or another department of a hospital.

At block 208, the method 200 comprises authenticating the authentication message by the application. In an embodiment, authenticating the authentication message by the application comprises comparing an authentication key contained in the authentication message to a corresponding key stored in the RFID chip. At block 210, the method 200 comprises reading the information stored in the non-transitory memory by the application. At block 212, the method 200 comprises transmitting the information read from the non-transitory memory by the application via the radio transceiver in the second frequency band to the reader or scanner.

Figure 4:
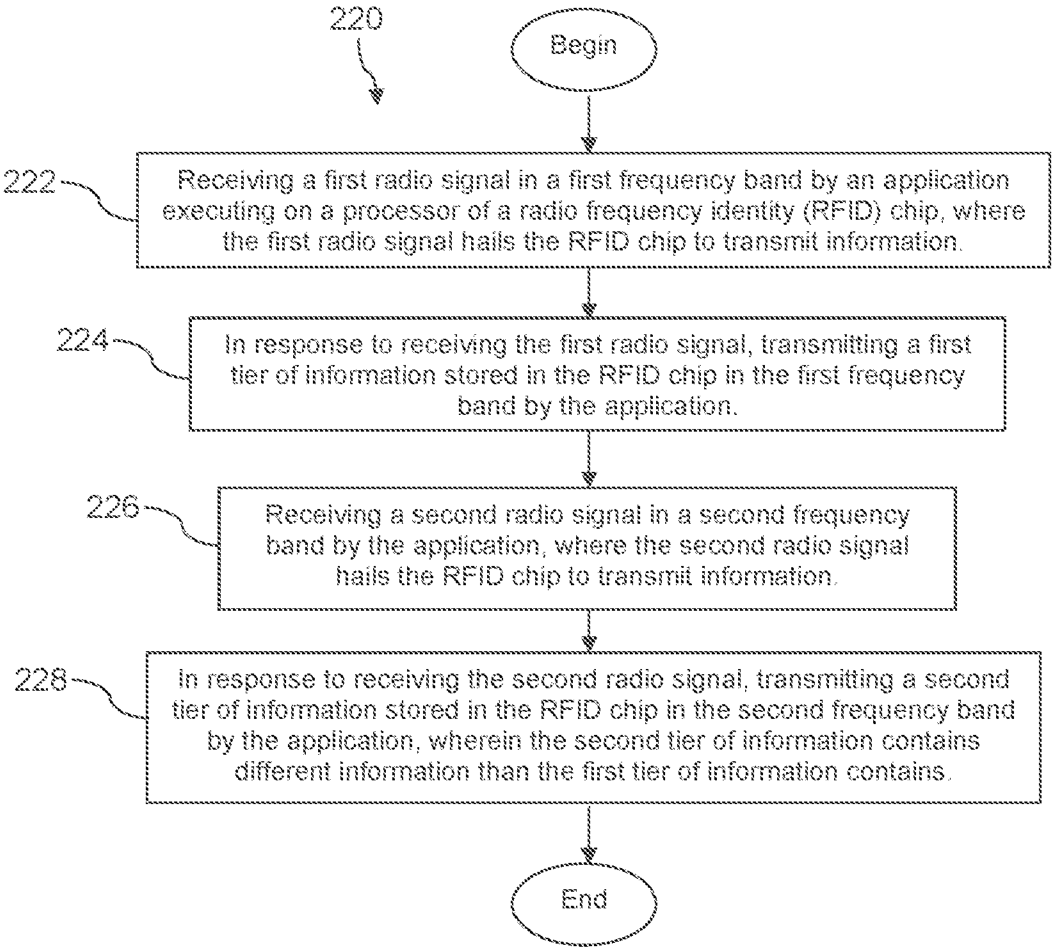
FIG. 4 is a flow chart of another method according to an embodiment of the disclosure.

Turning now to FIG. 4, a method 220 is described. In an embodiment, method 220 is a method of transmitting a first tier of information by a radio frequency identity (RFID) chip when hailed in a first frequency band and transmitting a second tier of information by the RFID chip when hailed in a second frequency band. In an embodiment, the first frequency band comprises a 946 MHz to 948 MHz frequency band. In an embodiment, the second frequency band is in the frequency range of 47 GHz to 60 GHz.

At block 222, the method 220 comprises receiving a first radio signal in a first frequency band by an application executing on a processor of a radio frequency identity (RFID) chip, where the first radio signal hails the RFID chip to transmit information. At block 224, the method 220 comprises, in response to receiving the first radio signal, transmitting a first tier of information stored in the RFID chip in the first frequency band by the application.

At block 226, the method 220 comprises receiving a second radio signal in a second frequency band by the application, where the second radio signal hails the RFID chip to transmit information. At block 228, the method 220 comprises, in response to receiving the second radio signal, transmitting a second tier of information stored in the RFID chip in the second frequency band by the application, wherein the second tier of information contains different information than the first tier of information contains. In an embodiment, the first tier of information comprises a generic identity associated with the RFID chip that is shared with a plurality of other RFID chips. In an embodiment, the second tier of information comprises a unique identity that is not shared with other RFID chips.

In an embodiment, the second radio signal is received from a reader, and the method 220 further comprises authenticating the reader by the application before transmitting the second tier of information. In an embodiment, authenticating the reader comprises comparing an authentication key stored in the RFID chip to an authentication key provided by the reader. In an embodiment, the second radio signal comprises a hash of a seed provided in the first tier of information, and authenticating the reader further comprises validating the hash of the seed provided in the second radio signal by the application.

Figure 5:
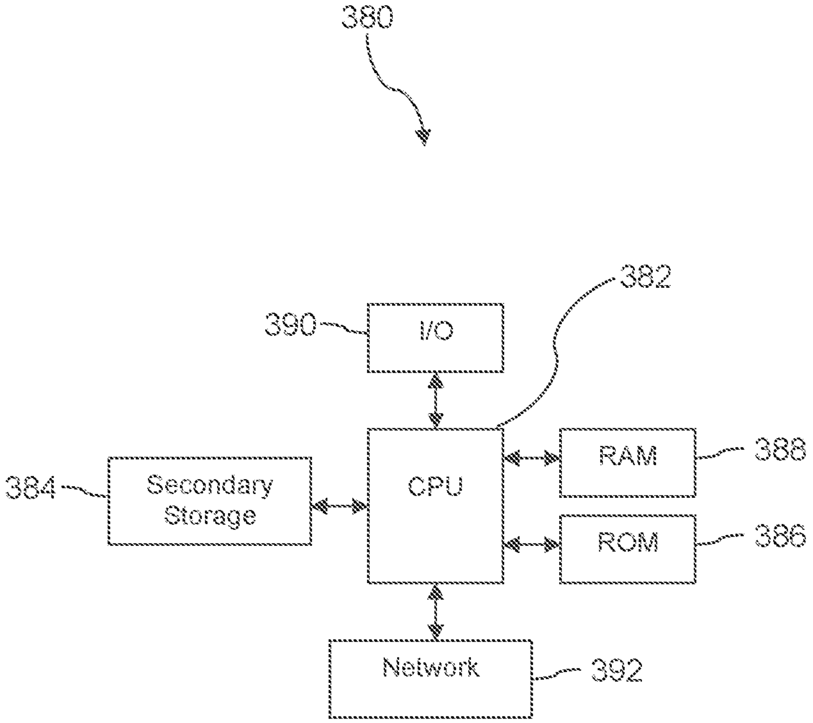
FIG. 5 is a block diagram of a computer according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 are typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A radio frequency identity (RFID) chip, comprising:

a processor;

a radio transceiver communicatively coupled to the processor;

a non-transitory memory that stores first information and second information; and an application stored in the non-transitory memory that, when executed by the processor:

receives a first radio signal in a first frequency band, in response to receiving the first radio signal, transmits the first information in the first frequency band, receives a second radio signal in a second frequency band from a reader, where the second radio signal comprises a hash of a seed provided in the first information, authenticates the reader by comparing an authentication key stored in the RFID chip to an authentication key provided by the reader and validating the hash of the seed provided in the second radio signal, and in response to receiving the second radio signal and authenticating the reader, transmits the second information in the second frequency band by the application.

2. The RFID chip of claim 1, wherein the first frequency band comprises a 946 MHz to 948 MHz frequency band.

3. The RFID chip of claim 1, wherein the second frequency band is in the frequency range of 47 GHz to 60 GHz.

4. The RFID chip of claim 1, wherein the first information comprises a generic identity associated with the RFID chip that is shared with a plurality of other RFID chips.

5. The RFID chip of claim 1, wherein the second information comprises a unique identity that is not shared with other RFID chips.

6. The RFID chip of claim 1, wherein the RFID chip receives power from ambient electromagnetic waves.

7. The RFID chip of claim 1, wherein the RFID chip comprises an electric battery.

8. The RFID chip of claim 1, wherein the radio transceiver comprises a first radio transceiver associated with the first frequency band and a second radio transceiver associated with the second frequency band.

9. A method of selectively transmitting different information by a radio frequency identity (RFID) chip when hailed in different frequency bands, comprising:

receiving a first radio signal in a first frequency band by an application executing on a processor of a radio frequency identity (RFID) chip, wherein the first frequency band is initially associated with a first tier of functionality;

in response to receiving the first radio signal, transmitting first information stored in the RFID chip in the first frequency band by the application;

receiving a second radio signal in a second frequency band by the application, wherein the second frequency band is initially associated with a second tier of functionality;

in response to receiving the second radio signal, transmitting second information stored in the RFID chip in the second frequency band by the application;

reconfiguring what frequency band is associated with each tier of functionality such that a third frequency band is subsequently associated with the first tier of functionality and a fourth frequency band is subsequently associated with the second tier of functionality;

receiving a third radio signal in the third frequency band by the application;

in response to receiving the third radio signal, transmitting the first information stored in the RFID chip in the third frequency band by the application;

receiving a fourth radio signal in a fourth frequency band by the application; and in response to receiving the fourth radio signal, transmitting the second information stored in the RFID chip in the fourth frequency band by the application.

10. The method of claim 9, wherein the first frequency band comprises a 946 MHz to 948 MHz frequency band.

11. The method of claim 9, wherein the second frequency band is in the frequency range of 47 GHz to 60 GHz.

12. The method of claim 9, wherein the second radio signal is received from a reader, further comprising authenticating the reader by the application before transmitting the second information.

13. The method of claim 12, wherein authenticating the reader comprises comparing an authentication key stored in the RFID chip to an authentication key provided by the reader.

14. The method of claim 13, wherein the second radio signal comprises a hash of a seed provided in the first information, and wherein authenticating the reader further comprises validating the hash of the seed provided in the second radio signal by the application.

15. A radio frequency identity (RFID) chip, comprising:

a processor;

a radio transceiver communicatively coupled to the processor;

a non-transitory memory that stores a first identity and a second identity; and an application stored in the non-transitory memory that, when executed by the processor:

receives a first radio signal in a first frequency band, in response to receiving the first radio signal, transmits the first identity in the first frequency band, receives a second radio signal in a second frequency band from a reader, in response to receiving the second radio signal, transmits the second identity in the second frequency band by the application, and transmits information about detected radio signals collected from a radio environment of the RFID chip to the reader in the second frequency band, wherein the information collected from the radio environment comprises at least one of (i) a list of beacon radio signals detected by the RFID chip along with a time stamp or (ii) a list of identities of other RFID chips that have responded to queries and have been overheard by the RFID chip and a time stamp when overheard.

16. The RFID chip of claim 15, wherein the application further authenticates the reader before transmitting the second identity and the information collected from the radio environment.

17. The RFID chip of claim 16, wherein authenticating the reader comprises comparing an authentication key stored in the RFID chip to an authentication key provided by the reader.

18. The RFID chip of claim 15, wherein the first frequency band comprises a 946 MHz to 948 MHz frequency band, and wherein the second frequency band is in the frequency range of 47 GHz to 60 GHz.

* * * * *